United States Patent [19]
Yim

[11] Patent Number: 5,723,965
[45] Date of Patent: Mar. 3, 1998

[54] VELOCITY CONTROL METHOD AND APPARATUS FOR SERVO MOTORS

[75] Inventor: Chung Hyuk Yim, Seoul, Rep. of Korea

[73] Assignee: Samsung Electronics Co., Ltd., Suwon, Rep. of Korea

[21] Appl. No.: 629,759

[22] Filed: Apr. 9, 1996

[30] Foreign Application Priority Data

Dec. 28, 1995 [KR] Rep. of Korea ............... 95-61659

[51] Int. Cl.$^6$ .................................................. G05B 19/29
[52] U.S. Cl. ........................ 318/601; 318/432; 318/609; 318/610; 388/802
[58] Field of Search ............................. 318/432, 609, 318/610, 615–619, 601; 388/802, 806, 902; 364/571.04

[56] References Cited

U.S. PATENT DOCUMENTS

| | | | |
|---|---|---|---|
| 5,101,145 | 3/1992 | Rehm | 318/432 |
| 5,138,564 | 8/1992 | DeJong et al. | 364/571.04 |
| 5,310,143 | 5/1994 | Yocum et al. | 364/459 |
| 5,400,033 | 3/1995 | Hablani | 342/95 |

*Primary Examiner*—Karen Masih
*Attorney, Agent, or Firm*—Burns, Doane, Swecker & Mathis, L.L.P.

[57] ABSTRACT

A velocity control method for use in a servo motor having a disturbance eliminator is described. The velocity control method includes the steps of calculating a control torque input value based on a desired target velocity input value and an output velocity value of an actual mechanical model, adding a disturbance torque value to the control torque input value to input the added result to the mechanical model, inputting the control torque input value to a virtual model to calculate an estimation velocity according to the control torque input value, calculating a corrected torque based on a velocity value difference between the output velocity value of the mechanical model and the estimation velocity value of the virtual model, and reflecting the corrected torque on the control torque input value. Accordingly, although unknown disturbances are input to the control system, a velocity error can be conversed into zero as closely as possible to enable an accurate velocity control.

9 Claims, 3 Drawing Sheets

VELOCITY CONTROL METHOD AND APPARATUS FOR SERVO MOTORS

BACKGROUND OF THE INVENTION

The present invention relates to a velocity control method for a servo motor and a velocity control apparatus adopting the same. A controller for calculating a control torque from a preset input value and a feedback portion for feeding back the output of an object to be controlled and comparing the feedback output with the input value are needed to automatically obtain a desired output from a servo motor or a robot which is the object to be controlled.

Meanwhile, an electrical disturbance due to noise or an electromagnetic wave, and a mechanical disturbance due to vibration or dynamic characteristics affect a control system in an actual system such as a robot or a machining tool. Such a disturbance is added to or subtracted from a control torque input or a feedback signal to thereby deteriorate a response performance and to further instabilize the system. Thus, a disturbance eliminator or a disturbance estimator is designed to minimize an influence due to such a disturbance.

FIG. 3 is a block diagram of a conventional control system having a servo motor and a disturbance eliminator. An input torque $\tau^*$ necessary to a desired velocity is converted into an actual current i corresponding to input torque $\tau^*$ and then the converted current i is applied to a servo motor 10. Then, a torque constant block 6 in servo motor 10 generates a torque $T_u$ in proportional to applied current i. A linear relationship between applied current i and generated torque $T_u$ is expressed as a torque constant $K_t$. When generated torque $T_u$ drives a rotator of servo motor 10, assuming that J is a moment of inertia, B is a viscous friction coefficient and s is a Laplacian variable, a dynamic characteristic is expressed as 1/(Js+B). Such a torque constant $K_t$ is represented in torque constant block 6 and the dynamic characteristic of the rotator is represented in dynamic characteristic block 7.

The above-described control system represents an ideal circumstance, but an actual control system is affected by various electrical or mechanical disturbance so that a response performance is lowered. To consider such various disturbances in designing a control system, it is assumed that a disturbance $T_L$ is applied between torque constant block 6 and dynamic characteristic block 7.

In this case, an output $\omega$ of dynamic characteristic block 7 affected by the disturbance is different from that when there is no disturbance $T_L$. Thus, output $\omega$ of dynamic characteristic block 7 affected by the disturbance $T_L$ becomes important information to predict disturbance $T_L$. Therefore, a disturbance estimator 8 estimates an actually applied disturbance $\hat{T}_L$ from corrected current i and output $\omega$ of dynamic characteristic block 7. The estimated disturbance $\hat{T}_L$ is fedback to the input side of torque constant block 6 and added to input torque $\tau^*$ in an adder 13 to increase current i and linearly increase generated torque $T_u$ by an amount of the increase of current i. Accordingly, although a negative disturbance $T_L$ is applied to generated torque $T_u$ in an adder 15, an amount of the increase of generated torque $T_u$ are cancelled each other, thereby unchanging an output velocity $\omega$. An effect of disturbance $T_L$ can be removed by using disturbance estimator 8.

However, since a disturbance elimination method using such a disturbance estimator does not operate on a real time basis, if a high-frequency disturbance is applied thereto, an estimation speed does not follow a changing speed of the high-frequency disturbance, with a result that the disturbance is not eradicated. Also, since the disturbance estimator is positioned in a feedback portion, an entire system becomes a high-gain controller by a gain adjustment of the disturbance estimator and is apt to be instabilized accordingly. Also, an internal gain value in the disturbance estimator is involved in a control system variable, to thereby make it difficult to design the control system.

SUMMARY OF THE INVENTION

Therefore, to solve the above problem, it is an object of the present invention to provide a velocity control method which makes it possible to converge a control error into zero as closely as possible all the time irrespective of a disturbance applied to a servo motor.

To accomplish the above object of the present invention, there is provided a velocity control method for use in a servo motor having a disturbance eliminator, the velocity control method comprising the steps of: calculating a control torque input value based on a desired target velocity input value and an output velocity value of an actual mechanical model; adding a disturbance torque value to the control torque input value to input the added result to the mechanical model; inputting the control torque input value to a virtual model to calculate an estimation velocity according to the control torque input value; calculating a corrected torque based on a velocity value difference between the output velocity value of the mechanical model and the estimation velocity value of the virtual model; and reflecting the corrected torque on the control torque input value.

Preferably, the control torque input value calculation step comprises the step of obtaining a proportional control input value by multiplying a difference value between the output velocity value of the mechanical model and the target velocity input value by a proportional constant.

Preferably, wherein the control torque input value calculation step further comprises the steps of: obtaining a feed forward control input value by multiplying a differentiation value of the target velocity input value by a feed forward constant; and obtaining the control torque input value by adding the feed forward control input value and the proportional control input value.

A relationship between an input torque and an output torque in the mechanical model is expressed as the following equation:

$$\tau^*(t)=J_n\cdot\dot{\omega}(t)+\Delta J(t)\cdot\dot{\omega}(t)+J(t)\cdot\omega(t)+F_f+T_d$$

in which $\tau^*(t)$ is an input torque, $J_n$ is a nominal moment of inertia, $\omega(t)$ is an angular velocity, $J(t)$ is a moment of inertia which is time-varying according to a load, $\Delta J(t)$ is expressed as $J_n-J(t)$, $F_f$ is a frictional torque and $T_d$ is a disturbance torque.

The estimation velocity in the virtual model is expressed as the following equation:

$$\hat{\omega}(s)=\frac{1}{J_n\cdot s}\cdot T_u(s)$$

in which $\hat{\omega}(s)$ is an estimation velocity, $T_u(s)$ is a control torque, and s is a Laplacian variable.

DETAILED DESCRIPTION OF THE PREFERRED EMBODIMENT

A preferred embodiment of the present invention will be described below in more detail with reference to the accompanying drawings FIGS. 1 and 2.

Figure 1:
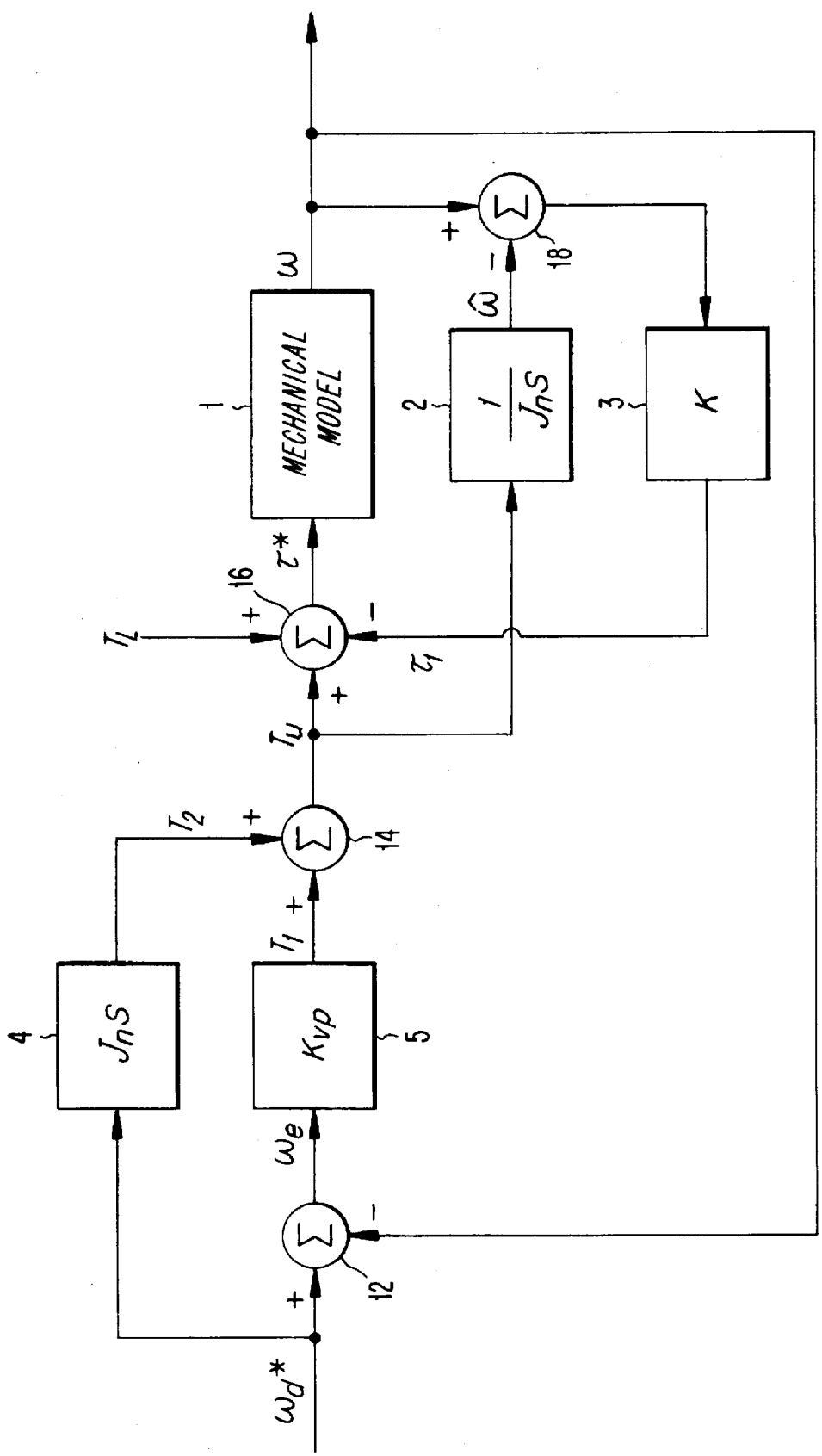
FIG. 1 is a block diagram of a control system according to the present invention.

In a control system of FIG. 1 according to the present invention, a controller largely includes a proportional controller 5 and a feed forward controller 4. The proporational controller 5 calculates a torque necessary for a servo motor to reach a desired velocity. This is because a linear relationship is established between a velocity error $\omega_e$ and generated torque $T_1$ within the boundary of a predetermined operating velocity in the servo motor. A slope of a straight line representing the linear relationship is a velocity proportional gain $K_{vp}$ representing proportional controller 5.

Feed forward controller 4 differentiates a target velocity input value $\omega_d^*$ to obtain an angular accelerating velocity. The angular accelerating velocity is multiplied by a feed forward constant, i.e., a moment of inertia $J_n$ to calculate a feed forward control input $T_2$. Since the feed forward controller 4 includes a differentiator (s), if target velocity input value $\omega_d^*$ is invariable, a value of feed forward control input $T_2$ becomes zero, to accordingly provide an effect that feed forward controller 4 does not operate. To the contrary, in case of a tracking control where target velocity input value $\omega_d^*$ is time-varying, feed forward controller 4 calculates an additional control input $T_2$ necessary for tracking target velocity input value $\omega_d^*$. This is because only by a proportional controler 5, the controller cannot track a parabolic input not less than a ramp input.

The outputs of proportional controller 5 and feed forward controller 4 are added in an adder 14 to produce a control torque input value $T_u$, and then added to a disturbance torque $T_L$ in another adder 16. Disturbance $T_L$ is added to a corrected torque $\tau_1$ between control torque input $T_u$ and the input of a mechanical model 1. Here, disturbance $T_L$ is positively added to control torque input $T_u$ and corrected torque $\tau_1$ is negatively added to control torque input $T_u$.

The adder 16 outputs input torque $\tau^*$ to the input end of mechanical model 1. The mechanical model of the actual servo motor is expressed as the following equation (1).

$$\tau^*(t) = J_n \cdot \dot\omega(t) + \Delta J(t) \cdot \dot\omega(t) + J(t) \cdot \omega(t) + F_f + T_d \quad (1)$$

Here, $\tau^*(t)$ is an input torque, $J_n$ is a nominal moment of inertia, $\omega(t)$ is an angular velocity, $J(t)$ is a moment of inertia which is time-varying according to a load, $\Delta J(t)$ is expressed as $J_n - J(t)$, $F_f$ is a frictional torque and $T_d$ is a disturbance torque.

Meanwhile, control torque input value $T_u$ is distributed in two directions, in which one is directed to mechanical model 1 and the other is directed to a virtual model 2. Virtual model 2 is designed by approximately estimating mechanical model 1, and expressed as the following equation (2).

$$\hat\omega(s) = \frac{1}{J_n \cdot s} \cdot T_u(s) \quad (2)$$

This is because an accurate modeling of mechanical model 1 is difficult and it is more convenient and effective to use a simple estimator than making an effort to obtain an accurate modeling. Here, $\hat\omega(s)$ is an output velocity of virtual model 2, $T_u(s)$ is a control torque, and s is a Laplacian variable.

A correction torque calculator 3 is constructed with a single torque conversion constant K and calculates a corrected torque $\tau_1$ in proportional to a difference between output velocity $\omega$ of mechanical model 1 and output velocity $\hat\omega$ of virtual model 2 via adder 18, as in proportional controller 5.

By the above construction, an operating principle of the present invention will be described and the equation of mechanical model 1 and necessary proof thereof will be described later on.

If a desired target velocity input $\omega_d^*$ is applied to the input end of the system, target velocity input $\omega_d^*$ is differentiated by feed forward controller 4 and amplified by a forward constant $J_n$, to calculate feed forward control input $T_2$.

An adder 12 outputs a difference between target velocity input $\omega_d^*$ and fedback velocity output $\omega$ as a velocity error $\omega_e$ to proportional controller 5 which calculates a proportional control input $T_1$. The feed forward control input $T_2$ and proportional control input $T_1$ are added in adder 14 to produce control torque input $T_u$.

Then, control torque input $T_u$ is branched to the input side of mechanical model 1 and the input end of virtual model 2.

Adder 16 adds disturbance $T_L$ to control torque input $T_u$ directed to mechanical model 1 and subtracts corrected torque $\tau_1$ output from correction torque calculator 3 which is a feedback portion from control torque input $T_u$, prior to being input to mechanical model 1, to finally produce input torque $\tau^*$. Mechanical model 1 starts to rotate according to input torque $\tau^*$ to output a velocity $\omega$.

The other branched control torque input $T_u$ is input to virtual model 2, and estimates an output velocity $\hat\omega$ of mechanical model 1 which is not influenced by disturbance $T_L$, to calculate an estimation velocity $\hat\omega$. Adder 18 subtracts estimation velocity $\hat\omega(s)$ from output velocity $\omega$ to calculate a velocity difference which is input to correction torque calculator 3.

Correction torque calculator 3 receives the input velocity difference and produces corrected torque $\tau_1$ in proportional to torque conversion constant K, to then be fedback to adder 16. The fedback corrected torque $\tau_1$ is negatively added in adder 16 unlike disturbance $T_L$. Accordingly, an effect of disturbance $T_L$ is cancelled with that of corrected torque $\tau_1$ to thereby provide an effect of removing disturbance $T_L$.

The output velocity $\omega$ of mechanical model 1 forms a unit feedback loop and is fedback between target velocity input $\omega_d^*$ and velocity error $\omega_e$ to play a role of reducing an error between target velocity input $\omega_d^*$ and velocity error $\omega$.

The above-described system can be implemented by installing an actual servo motor or an arm of a robot in the position where mechanical model 1 is located. Besides, the other blocks are implemented in a control program by software and then interfaced using a velocity sensor and a digital-to-analog converter amd an analog-to-digital converter.

Figure 2:
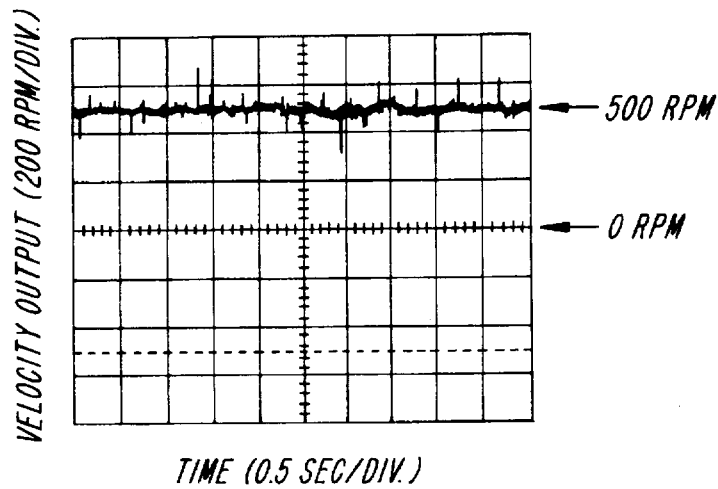
FIG. 2 is a graphical view showing a response characteristic of the control system in FIG. 1.
Figure 3:
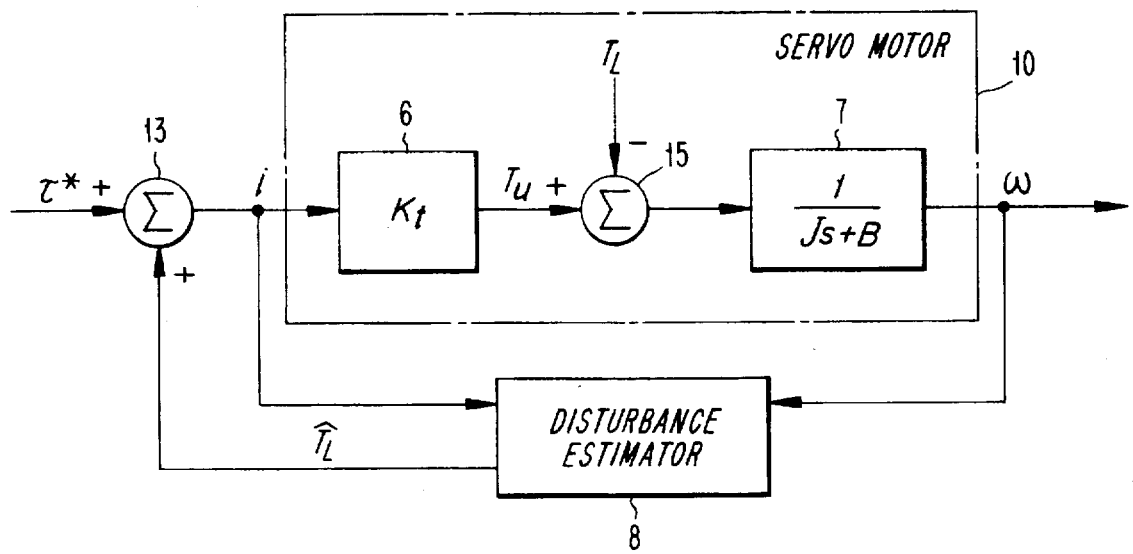
FIG. 3 is a block diagram of a conventional control system having a servo motor and a disturbance controller.

By using the above-described consturction of FIG. 1, the velocity of the actual servo motor is controlled, of which the control result is shown in FIG. 2. Meanwhile, the velocity of the actual servo motor is controlled using the conventional control system having a disturbance eliminator 8 shown in FIG. 3, in which the control result is shown in FIG. 4.

Figure 4:
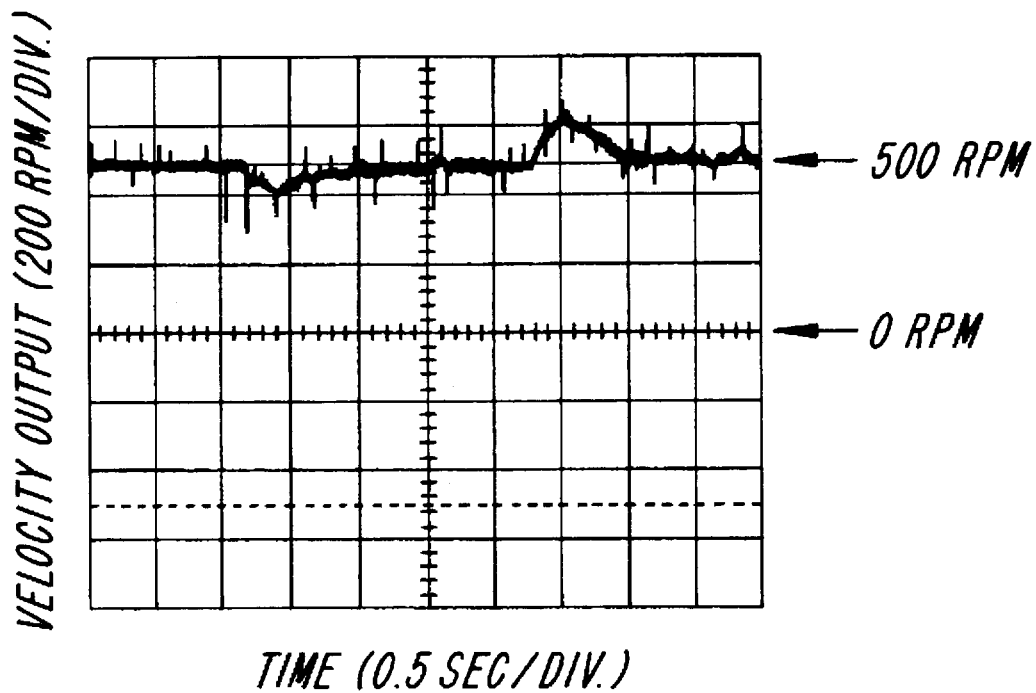
FIG. 4 is a graphical view showing a response characteristic of the control system in FIG. 3.

Referring to FIGS. 2 and 4, the effect of the present invention is compared with that of the conventional art. Referring to FIG. 4, whenever disturbance $T_L$ is applied, disturbance eliminator 8 is not effectively cancelled and reflected on output velocity $\omega$, to provide an inconsistent response. Meanwhile, referring to FIG. 2, although an identical disturbance $T_L$ is applied, correction torque calculator 3 which performs a function of a disturbance eliminator cancels disturbance $T_L$ on a real time basis, so that the effect of the disturbance is not reflected on output velocity ω. Thus, output velocity ω has a consistent response performance.

As described above, although unknown disturbances are input to a control system, the present invention can converge the velocity error into zero as closely as possible to thereby enable an accurate velocity control.

Hereinbelow, the present invention will be expressed in the equations and the necessary proofs thereof will be given.

First, mechanical model 1 in a time domain is expressed as the above-described equation (1).

$$\tau^*(t) = J_n \cdot \dot{\omega}(t) + \Delta J(t) \cdot \dot{\omega}(t) + J(t) \cdot \omega(t) + F_f + T_d \quad (1)$$

An input torque $\tau^*$ is expressed as the following equation (3) using the control system of FIG. 1.

$$\tau^*(t) = J_n \cdot \dot{\omega}_d(t) + K_{vp} \cdot \omega_e(t) - \tau_1(t) \quad (3)$$

Here, $\omega_e(t) = \omega_d(t) - \omega(t)$.

Using equations (1) and (3), $\tau^*(t)$ is simply expressed as the following equation (4).

$$\tau^*(t) = J_n \cdot \dot{\omega}_d(t) + \tau_d(t) \quad (4)$$

Here, $\tau_d(t) = \Delta J(t) \cdot \dot{\omega}(t) + J(t) \cdot \omega(t) + F_f + T_d$ Then, mechanical model and the disturbance eliminator in the srvo motor are modelled as following equations (5) and (6).

$$\hat{\omega}(t) = \frac{1}{J_n} [J_n \cdot \dot{\omega}_d(t) + K_{vp}\{\omega_d(t) - \omega(t)\}] \quad (5)$$

$$\tau_1(t) = K\{\omega(t) - \hat{\omega}(t)\} \quad (6)$$

Then, for the performance analysis, we define the following expressions (7), (8) and (9).

$$e_1(t) = \int_0^t \{\omega_d(t) - \omega(t)\} dt \quad (7)$$

$$e_2(t) = \dot{e}_1(t) \quad (8)$$

$$\{|J(t)| \leq d_1, |\Delta J(t)| \leq d_2, |T_d| \leq d_3, |F_f| \leq d_4, |\omega_d(t)| \leq d_5, |\dot{\omega}_d(t)| \leq d_6\} \quad (9)$$

Using the expressions (7), (8) and (9), the present invention is proved as the following proof. Accordingly, it can be seen that the velocity control error becomes always zero irrespective of the presence of the disturbance.

Proof

Various constants are defined as follows.

$$b_1 > \frac{1}{2} + \delta_1, \quad (10)$$

$$\delta_1 > 0 \quad (11)$$

$$Y \equiv (b_1 - \frac{1}{2}\delta_1)/\{b_1^2 + d_1/(J_n - d_2)\} \quad (12)$$

$$K_{vp} \equiv J_n \cdot K/(K - J_n) \quad (13)$$

$$\delta_2 \equiv Y(\sqrt{Y} + b_1 Y)\bar{d}/\{\sqrt{2}(J_n - d_2)\}, \epsilon > 0 \quad (14)$$

$$\epsilon > 0 \quad (15)$$

$$K > \bar{e} \quad (16)$$

Here, $$\bar{d} \equiv d_1 d_5 + d_2 d_6 + d_3 + d_4 \quad (17)$$

$$\bar{e} \equiv (J_n + d_2)\{(\delta_2 + \frac{1}{2})/Y + b_1^2/2 + 3d_1/2(J_n - d_2) + b_1\} \quad (18)$$

Then, $\xi$, d and V which is called the Lyapunov function are determined as the following equations (19) through (21).

$$\xi = e_2 + b_1 e_1 \quad (19)$$

$$d = J(t)\omega_d + \Delta J(t) \cdot \dot{\omega}_d + T_d + F_f \quad (20)$$

$$V \equiv (|e_1|^2 + Y|\xi|^2)/2 \quad (21)$$

Then, the following equation (22) is satisfied.

$$\dot{V} = e_1(\zeta - b_1 e_1) + Y\zeta e_1\{(\bar{K}_2 - \bar{K}_1 + J)/J - b_1^2\} + \quad (22)$$

$$Y\{b_1 - (\bar{K}_2 + J)/J\}\zeta^2 + Yd\zeta/J \leq$$

$$-[b_1 - Y\{b_1^2 + d_1/(J_n - d_2)\}/2 - \frac{1}{2}]e_1^2 +$$

$$Y|d| |\zeta|/(J_n - d_2) + [Y\{b_1^2/2 + 3d_1/2(J_n - d_2) + b_1 - \bar{K}_2/(J_n + d_2)\} + \frac{1}{2}]\zeta^2$$

Here, $$\bar{K}_1 \equiv KK_{vp}/J_n \quad (23)$$

$$\bar{K}_2 \equiv K + K_{vp} \quad (24)$$

By equation (9), equation (22) is expressed as equation (25).

$$\dot{V} \leq -\delta_1 e_1^2 - \delta_2 \zeta^2 + |\zeta| Y\bar{d}/(J_n - d_2) = \quad (25)$$
$$-\delta_1 e_1^2 - \delta_2 |\zeta|\{|\zeta| - Y\bar{d}/(J_n - d_2)\delta_2\}.$$

Then, the following equations (26) and (27) are defined.

$$\bar{e}_1 \equiv e_1/\sqrt{Y} \quad (26)$$

$$\delta \equiv Y\bar{d}/(J_n - d_2)\delta_2 \quad (27)$$

Thus, the Lyapunov function of equation (21) can be expressed as the following equation (28).

$$V \equiv Y(|\bar{e}_1|^2 + |\zeta|^2)/2 \quad (28)$$

Here, if $$|\bar{e}_1|^2 + |\zeta|^2 > \delta^2 \dot{V} < 0 \quad (29)$$

Thus, T>0, and T satisfying the following inequality (30) exists.

$$V \leq \frac{1}{2} Y\delta^2, \forall t \geq T. \quad (30)$$

That is, the following inequality (31) is satisfied.

$$|\zeta| \leq \sqrt{Y}\delta/\sqrt{\omega\omega}, |\bar{e}_1| \leq \sqrt{2}, \forall t \geq T \quad (31)$$

From equation (21) and inequality (31) the following inequality (32) is satisfied.

$$|e_2| \leq (\sqrt{Y}b_1 Y)\delta/\sqrt{2} < \epsilon, \forall t \geq T \quad (32)$$

Also, since $|\zeta| \geq |e_2| - b_1|e_1|$, the following inequality is satisfied.

$$|e_1| \leq Y\delta/\sqrt{2}, \forall t \geq T \quad (33)$$

Thus, the velocity error is always small enough within the bounds desired.

Proof end

What is claimed is:

1. A velocity control method for use in a servo motor having a disturbance eliminator, said velocity control method comprising the steps of:
    calculating a control torque input value based on a desired target velocity input value and an output velocity value of an actual mechanical model;

adding a disturbance torque value to the control torque input value to input the added result to said mechanical model;

inputting the control torque input value to a virtual model to calculate an estimation velocity according to the control torque input value;

calculating a corrected torque based on a velocity value difference between the output velocity value of said mechanical model and the estimation velocity value of said virtual model; and reflecting the corrected torque on the control torque input value.

2. A velocity control method for use in a servo motor according to claim 1, wherein said control torque input value calculation step comprises the step of obtaining a proportional control input value by multiplying a difference value between the output velocity value of said mechanical model and the target velocity input value by a proportional constant.

3. A velocity control method for use in a servo motor according to claim 2, wherein said control torque input value calculation step further comprises the steps of:

obtaining a feed forward control input value by multiplying a differentiation value of the target velocity input value by a feed forward constant; and obtaining the control torque input value by adding the feed forward control input value and the proportional control input value.

4. A velocity control method for use in a servo motor according to claim 1, wherein a relationship between an input torque and an output torque in said mechanical model is expressed as the following equation:

$$\tau^*(t) = J_n \cdot \dot{\omega}(t) + \Delta J(t) \cdot \dot{\omega}(t) + J(t) \cdot \omega(t) + F_f + T_d$$

in which $\tau^*(t)$ is an input torque, $J_n$ is a nominal moment of inertia, $\omega(t)$ is an angular velocity, $J(t)$ is a moment of inertia which is time-varying according to a load, $\Delta J(t)$ is expressed as $J_n - J(t)$, $F_f$ is a frictional torque and $T_d$ is a disturbance torque.

5. A velocity control method for use in a servo motor according to claim 2, wherein a relationship between an input torque and an output torque in said mechanical model is expressed as the following equation:

$$\tau^*(t) = J_n \cdot \dot{\omega}(t) + \Delta J(t) \cdot \dot{\omega}(t) + J(t) \cdot \omega(t) + F_f + T_d$$

in which $\tau^*(t)$ is an input torque, $J_n$ is a nominal moment of inertia, $\omega(t)$ is an angular velocity, $J(t)$ is a moment of inertia which is time-varying according to a load, $\Delta J(t)$ is expressed as $J_n - J(t)$, $F_f$ is a frictional torque and $T_d$ is a disturbance torque.

6. A velocity control method for use in a servo motor according to claim 3, wherein a relationship between an input torque and an output torque in said mechanical model is expressed as the following equation:

$$\tau^*(t) = J_n \cdot \dot{\omega}(t) + \Delta J(t) \cdot \dot{\omega}(t) + J(t) \cdot \omega(t) + F_f + T_d$$

in which $\tau^*(t)$ is an input torque, $J_n$ is a nominal moment of inertia, $\omega(t)$ is an angular velocity, $J(t)$ is a moment of inertia which is time-varying according to a load, $\Delta J(t)$ is expressed as $J_n - J(t)$, $F_f$ is a frictional torque and $T_d$ is a disturbance torque.

7. A velocity control method for use in a servo motor according to claim 1, wherein the estimation velocity in said virtual model is expressed as the following equation:

$$\hat{\omega}(s) = \frac{1}{J_n \cdot s} \cdot T_u(s)$$

in which $\hat{\omega}(s)$ is an estimation velocity, $T_u(s)$ is a control torque, and s is a Laplacian variable.

8. A velocity control method for use in a servo motor according to claim 2, wherein the estimation velocity in said virtual model is expressed as the following equation:

$$\hat{\omega}(s) = \frac{1}{J_n \cdot s} \cdot T_u(s)$$

in which $\hat{\omega}(s)$ is an estimation velocity, $T_u(s)$ is a control torque, and s is a Laplacian variable.

9. A velocity control method for use in a servo motor according to claim 3, wherein the estimation velocity in said virtual model is expressed as the following equation:

$$\hat{\omega}(s) = \frac{1}{J_n \cdot s} \cdot T_u(s)$$

in which $\hat{\omega}(s)$ is an estimation velocity, $T_u(s)$ is a control torque, and s is a Laplacian variable.

* * * * *